UNITED STATES PATENT OFFICE

2,211,327

CELLULOSE ORGANIC ACID ESTER COMPOSITION CONTAINING ACYL AMIDES

Jack J. Gordon, Kingsport, Tenn., assignor to Eastman Kodak Company, Rochester, N. Y., a corporation of New Jersey No Drawing. Application October 14, 1939, Serial No. 299,526

7 Claims. (Cl. 106—40)

This invention relates to compositions of matter in which cellulose organic acid esters, such, for instance, as cellulose acetate, cellulose acetate-propionate, cellulose acetate-butyrate, cellulose propionate, cellulose butyrate, and the like, are combined or mixed with a plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, film, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of hardness, toughness and elasticity.

I have discovered that valuable properties may be induced in and/or contributed to compositions containing cellulose organic acid esters, such as cellulose acetate, cellulose acetate-propionate, cellulose acetate-butyrate, and the like, by adding thereto, as a plasticizing compound, an acyl amide selected from the group consisting of acetoacetamide, N,N-di-n-butyl acetamide, diacetamide, N-methyl diacetamide, N-n-butyl diacetamide, N-n-amyl diacetamide, and N-n-butyl dipropionamide. The particularly useful properties which these compounds induce in or contribute to cellulose ester compositions containing them are hereinafter enumerated. I give, below, methods of preparing these compounds.

EXAMPLE I.—*Acetoacetamide.*—1160 grams of methyl acetoacetate was weighed into a 3-liter beaker and 780 grams of a 28% aqueous solution of ammonia was poured into it. The solution was shaken for a few minutes, then cooled in a bath of melting ice for several hours. The precipitate was filtered off, washed twice with ice-cold ethyl alcohol, dissolved in hot ethyl alcohol, cooled, and filtered off again. The product, $CH_3.CO.CH_2.CO.NH_2$, had a melting point of 81° C., and a specific gravity of 0.968 at 114° C.

EXAMPLE II.—*N,N-Di-n-butyl acetamide.*—2600 grams of 97% acetic anhydride was placed in a 3-necked, 12-liter flask equipped with a stirrer, a reflux condenser, and a dropping funnel. 1,790 grams of di-n-butyl amine was added dropwise with vigorous agitation. After all the amine had been added, the material was refluxed for 4 hours. Then, most of the acetic acid formed and the excess anhydride was distilled off at atmospheric pressure. The remainder was removed by distilling under reduced pressure. The product, $CH_3.CO.N(C_4H_9)_2$, was distilled under vacuum.

EXAMPLE III.—*Diacetamide.*—708 grams of acetamide was placed in a 3-necked 3-liter flask and heated on an oil bath until melted. 1,224 grams of acetic anhydride was dropped in slowly, with constant agitation of the molten acetamide. After the addition of all the anhydride, the acetic acid formed and the excess acetic anhydride were distilled off at atmospheric pressure, and the product, $(CH_3.CO)_2NH$, was washed with ether.

EXAMPLE IV.—*N-methyl diacetamide.*—520 grams of a 30% aqueous solution of methyl amine was dripped slowly into 2,225 grams of acetic anhydride, with agitation. The acetic acid formed in the reaction was distilled off. The product, $(CH_3.CO)_2.N.CH_3$, distilled over at 197–203° C. Its melting point was 17° C.; sp. gr. 20°/4° C., 0.9740; refractive index, 1.4293 (25°).

EXAMPLE V.—*N-n-butyl diacetamide.*—7000 grams of 97% acetic anhydride was placed in a 3-necked, 12-liter flask equipped with a stirrer, reflux condenser, and dropping funnel. 2,200 grams of 95% n-butyl amine was added dropwise, with vigorous agitation. After all the n-butyl amine had been added, the material was heated for 6 hours at 122° C. Then, as much acetic acid and acetic anhydride as possible was distilled off at atmospheric pressure; the remainder was distilled off at reduced pressure. The formula of the product is

$$(CH_3.CO)_2.N.(CH_2)_3.CH_3$$

EXAMPLE VI.—*N-n-amyl diacetamide.*—1560 grams of acetic anhydride was placed in a 3-liter flask fitted with a refluxing column and condenser. The anhydride was refluxed gently, and 610 grams of n-amyl amine was added slowly through the top of the condenser. After all the amyl amine had been added, the acetic acid formed in the reaction and the excess acetic anhydride were removed by distillation at atmospheric pressure. The product,

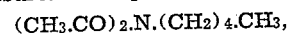
$$(CH_3.CO)_2.N.(CH_2)_4.CH_3,$$

was distilled at 26.5 mm. Hg. pressure, coming over at a temperature of 126–128° C. It was still viscous at −56° C.; sp. gr. 20°/4° C., 0.946.

EXAMPLE VII.—*N-n-butyl dipropionamide.*— 1625 grams of propionic anhydride was weighed into the 3-liter reaction flask of a set-up such as that described in Example V, and stirred vigorously while 435 grams of n-butyl amine was added dropwise through the condenser. After all the butyl amine had been added, the propionic acid formed in the reaction, and the excess propionic anhydride were distilled off at atmospheric pressure. The product,

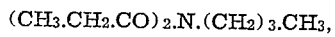

distilled at 167° C. at 103 mm. Hg. pressure. It had a melting point of −32° C.

In order that those skilled in this art may better understand my invention I would state, by way of illustration, that for the manufacture of photographic film base or other sheets my new compositions of matter may be compounded as follows: 100 parts of acetone-soluble cellulose acetate, i. e., cellulose acetate containing from about 36% to 42% acetyl radical, is dissolved with stirring at atmospheric temerature in 300 to 500 parts, preferably 400 parts by weight, of acetone. To this solution may be added from 10 to 50 parts by weight of any of my novel plasticizers named above. Within the limits stated, the amount of plasticizer may be decreased or increased, depending upon whether it is desired to decrease or increase, respectively, the properties which these plasticizers contribute to the finished product. The amount of volatile solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with my invention are very tough and flexible, and maintain flexibility in a superior fashion.

Other volatile solvents which are compatible with the cellulose acetate and my new plasticizers will also occur to those skilled in this art, such as ethylene chloride-alcohol mixtures. In like manner these plasticizers may be compounded with other single organic acid esters of cellulose, such as cellulose propionate, butyrate, stearate and the like, or with mixed organic acid esters, such as cellulose acetate-stearate, cellulose acetate-propionate, cellulose acetate-butyrate, cellulose acetate-lactate, cellulose acetate-tartrate or the like, a suitable solvent which will dissolve both the cellulose ester and the plasticizer being employed, such, for instance, as an alkylene chloride with or without the addition of alcohol. For instance, cellulose acetate-propionate and any of my new plasticizers may be dissolved in ethylene chloride or in a mixture of propylene chloride and methanol, and sheets of excellent flexibility may be deposited from these solutions. Other substances, such as fire-retardents, etc., may be added to the film-forming compositions.

My novel plasticizers may also be advantageously used as plasticizers in cellulose organic acid ester molding compositions. For instance, about 25 to 100 parts of the plasticizer, depending on the hardness or softness of the plastic desired, may be homogeneously mixed with 100 parts of cellulose acetate, and the mixture converted into a transparent or translucent plastic product by molding at a temperature of 140–160° C. and a pressure of 2500 to 4000 pounds per square inch for a period of from 2 to 5 minutes, in a manner well known to those skilled in molding compounds of that nature. The softer plastics may be extruded through a die.

N-methyl diacetamide is a solvent for cellulose acetate at room temperature, while acetoacetamide, N,N-di-n-butyl acetamide, diacetamide, N-n-butyl diacetamide, N-n-amyl diacetamide, and N-n-butyl dipropionamide are solvents for cellulose acetate when heated. When 30 or more parts of any of these plasticizers is worked on hot rolls with 100 parts of cellulose acetate, in the absence of any other solvent, it completely gelatinizes the cellulose acetate after a short period of mixing, giving a completely homogeneous plastic mass.

What I claim as my invention and desire to be secured by Letters Patent of the United States is:

1. A composition comprising a cellulose organic acid ester and, as a plasticizer therefor, an acyl amide selected from the group consisting of acetoacetamide, N,N-di-n-butyl acetamide, diacetamide, N-methyl diacetamide, N-n-butyl diacetamide, N-n-amyl diacetamide, and N-n-butyl dipropionamide.

2. A composition comprising cellulose acetate and, as a plasticizer therefor, an acyl amide selected from the group consisting of acetoacetamide, N,N-di-n-butyl acetamide, diacetamide, N-methyl diacetamide, N-n-butyl diacetamide, N-n-amyl diacetamide, and N-n-butyl dipropionamide.

3. A composition comprising cellulose acetate-propionate and, as a plasticizer therefor, an acyl amide selected from the group consisting of acetoacetamide, N,N-di-n-butyl acetamide, diacetamide, N-methyl diacetamide, N-n-butyl diacetamide, N-n-amyl diacetamide, and N-n-butyl dipropionamide.

4. A composition comprising cellulose acetate-butyrate and, as a plasticizer therefore, an acyl amide selected from the group consisting of acetoacetamide, N,N-di-n-butyl acetamide, diacetamide, N-methyl diacetamide, N-n-butyl diacetamide, N-n-amyl diacetamide, and N-n-butyl dipropionamide.

5. A transparent, flexible sheet comprising a cellulose organic acid ester and, as a plasticizer therefor, an acyl amide selected from the group consisting of acetoacetamide, N,N-di-n-butyl acetamide, diacetamide, N-methyl diacetamide, N-n-butyl diacetamide, N-n-amyl diacetamide, and N-n-butyl dipropionamide.

6. A molding composition adapted for molding under elevated temperatures and high pressures, comprising a cellulose organic acid ester and, as a plasticizer therefor, an acyl amide selected from the group consisting of acetoacetamide, N,N-di-n-butyl acetamide, diacetamide, N-methyl diacetamide, N-n-butyl diacetamide, N-n-amyl diacetamide, and N-n-butyl dipropionamide.

7. A composition comprising 100 parts of a cellulose organic acid ester and, as a plasticizer therefor, from 5 to 100 parts, approximately, of an acyl amide selected from the group consisting of acetoacetamide, N,N-di-n-butyl acetamide, diacetamide, N-n-amyl diacetamide, and N-n-butyl dipropionamide.

JACK J. GORDON.